(12) United States Patent
Vaara et al.

(10) Patent No.: US 6,321,083 B1
(45) Date of Patent: Nov. 20, 2001

(54) TRAFFIC HOT SPOT LOCATING METHOD

(75) Inventors: Tomi Vaara, Espoo; Risto Aalto, Riihimäki, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,523

(22) PCT Filed: Oct. 7, 1997

(86) PCT No.: PCT/FI97/00607

§ 371 Date: Mar. 29, 1999

§ 102(e) Date: Mar. 29, 1999

(87) PCT Pub. No.: WO98/16078

PCT Pub. Date: Apr. 16, 1998

(30) Foreign Application Priority Data

Oct. 10, 1996 (FI) .......................................... 964066

(51) Int. Cl.⁷ .................. H04Q 7/20; H04Q 7/36
(52) U.S. Cl. .................. 455/422; 455/432; 455/434; 455/435; 455/440; 455/443; 455/8; 455/9; 455/67.1
(58) Field of Search ..................... 455/422, 432, 455/434, 435, 453, 440, 443, 461, 9, 8, 67.1, 67.7, 403

(56) References Cited

U.S. PATENT DOCUMENTS 5,423,067   6/1995   Manabe ............................. 455/67.1
5,915,221 * 6/1999   Sawyer et al. ....................... 455/422

FOREIGN PATENT DOCUMENTS

| 0 320 913 | 6/1989 | (EP) . |
| 0 431 956 | 6/1991 | (EP) . |
| 0 631 453 | 12/1994 | (EP) . |
| 2 294 181 | 4/1996 | (GB) . |
| WO 92/05672 | 4/1992 | (WO) . |
| WO 94/06222 | 3/1994 | (WO) . |
| WO 95/07587 | 3/1995 | (WO) . |

* cited by examiner

Primary Examiner—William Trost
Assistant Examiner—Keith Ferguson
(74) Attorney, Agent, or Firm—Altera Law Group, LLC

(57) ABSTRACT

The present invention relates to a method and an arrangement for determining a hot spot of telephone traffic in a cell. The invention uses simultaneously two basic measurements of digital radio systems; timing advance and adjacent cell measurement. Timing advance informs the distance of the mobile station from the base station but not the direction. On the basis of the measured signal strengths of adjacent cells it is possible to determine a set of possible locations of the mobile station when there is information about the coverage area of individual adjacent cells. When these measurements are used simultaneously, they exclude the inaccuracies of each other and enable very accurate location determination for monitoring traffic distribution. Timing advance is utilized to determine a set of circular, base-station-centric areas and adjacent cell measurements are utilized to determine the direction of the mobile station to the base

11 Claims, 6 Drawing Sheets

| TRIPLET #1 | $n_0$ | $n_1$ | $n_2$ | ... | $n_{10+}$ | #1 |
|---|---|---|---|---|---|---|
| TRIPLET #2 | $n_0$ | $n_1$ | $n_2$ | ... | $n_{10+}$ | #2 |
| TRIPLET #3 | $n_0$ | $n_1$ | $n_2$ | ... | $n_{10+}$ | #3 |
| ... | | | | | | ... |
| TRIPLET #99 | $n_0$ | $n_1$ | $n_2$ | ... | $n_{10+}$ | #99 |
| TRIPLET #100 | $n_0$ | $n_1$ | $n_2$ | ... | $n_{10+}$ | #100 |

| TOTAL TRAFFIC | TCH RESERVATIONS | ~ 21 |
|---|---|---|
| | FREE_SLOT_INDEX | ~ 22 |

Fig. 2

| LAC & CI | LAC & CI | LAC & CI | $n_0$ | $n_1$ | $n_2$ | ... | $n_{10+}$ | #1 |
|---|---|---|---|---|---|---|---|---|
| LAC & CI | LAC & CI | LAC & CI | $n_0$ | $n_1$ | $n_2$ | ... | $n_{10}$ | #2 |
| ... | | | | | | | | ... |
| LAC & CI | LAC & CI | LAC & CI | $n_0$ | $n_1$ | $n_2$ | ... | $n_{10}$ | #10 |

| TOTAL TRAFFIC | TCH RESERVATIONS |
|---|---|

Fig. 4

CELL A

|    | 1  | 2  | 3  | 4  | 5  | 6  | 7  | 8  | 9  | 10 | 11 | 12 | 13 |
|----|----|----|----|----|----|----|----|----|----|----|----|----|----|
| 1  | 23 | 26 | 4  | 29 | 28 | 26 | 19 | 13 | 18 | 11 | 3  | 14 | 29 |
| 2  | 9  | 27 | 17 | 14 | 21 | 26 | 12 | 30 | 13 | 16 | 23 | 6  | 19 |
| 3  | 27 | 5  | 12 | 23 | 26 | 14 | 28 | 8  | 9  | 20 | 26 | 2  | 20 |
| 4  | 7  | 28 | 8  | 26 | 18 | 3  | 25 | 2  | 27 | 17 | 18 | 23 | 7  |
| 5  | 28 | 10 | 1  | 6  | 24 | 24 | 17 | 18 | 24 | 3  | 12 | 15 | 5  |
| 6  | 28 | 13 | 16 | 11 | 14 | 3  | 18 | 11 | 8  | 1  | 28 | 17 | 4  |
| 7  | 23 | 25 | 17 | 26 | 21 | 7  | 7  | 8  | 6  | 13 | 25 | 30 | 3  |
| 8  | 30 | 10 | 10 | 24 | 8  | 19 | 29 | 10 | 2  | 26 | 15 | 15 | 25 |
| 9  | 25 | 5  | 2  | 1  | 10 | 1  | 10 | 27 | 14 | 24 | 18 | 4  | 5  |
| 10 | 9  | 18 | 10 | 27 | 4  | 21 | 24 | 4  | 27 | 8  | 28 | 27 | 15 |
| 11 | 15 | 27 | 16 | 16 | 12 | 29 | 27 | 14 | 22 | 2  | 20 | 22 | 25 |
| 12 | 27 | 3  | 1  | 9  | 18 | 12 | 20 | 6  | 19 | 16 | 22 | 12 | 8  |
| 13 | 0  | 10 | 22 | 6  | 24 | 3  | 11 | 10 | 22 | 28 | 10 | 29 | 29 |

CELL B

TRAFFIC HOT SPOT LOCATING METHOD

FIELD OF INVENTION

The invention relates to a method for determining traffic distribution in a mobile communication system.

BACKGROUND ART

The geographical area covered by cellular mobile communication systems is divided into smaller radio areas, i.e. radio cells to attain a better use of the frequency channel by means of the reuse of frequencies. The size of radio cells and the number of channel resources allocated to them (radio channels/traffic channels) vary depending on many factors, such as the required capacity, terrain, the used transmission powers, etc. The object is to estimate these factors as well as possible as early as the planning stage of the cellular network in such a manner that it is possible to provide a service of a sufficient quantity and quality in all parts of the radio network. As network planning is anyway based on estimates and forecasts and the need for capacity is continuously changing by areas, the distribution of loading is continuously monitored in built networks, too and possible problem areas are attempted to be discovered. General information about loading is derived from various call statistics with which even cell-specific accuracy can be attained. As a result, it possible to increase channel capacity in an overloaded cell, or to modify the network in some other way. Various call statistics do not, however, provide any information about how traffic load is distributed geographically inside an individual cell. If this information could be collected from the network, it would enable a more accurate focusing of additional capacity (additional frequencies) to the places of a cell with a great amount of traffic (so-called hot spots) or even to establish a new cell in this place.

In practice, the location of spots hot with traffic requires the location of the individual mobile stations having an ongoing call. Prior art discloses several different methods for locating mobile stations for other purposes than traffic monitoring.

WO 9507587 discloses a method where the mobile station measures the signal strengths of surrounding base stations. The rough location and distance of the mobile stations from each base station is determined on the basis of the signal strengths. A theoretical geographical distance between the transmission and reception is calculated from radio path attenuation which is determined as the difference between the transmitted and received signal strength.

In WO 9205672 the mobile station listens to the control channels of surrounding base stations and selects at least three base stations and establishes a call to them. Each base station calculates its distance to the mobile station by using a timing advance value. The location of the mobile station can be determined by means of at least three calculated distances.

EP-0320913 teaches a location method where base stations whose locations are known transmit identifier signals and an accurate time pulse in sync with one another. The times of arrival of time pulses at different base stations are proportional to the distance between the mobile station and the base station, in which case the location of the mobile station can be determined by using at least three base stations.

These known location methods of mobile stations, intended for locating individual mobile stations, are, however, too complicated and difficult to calculate or even completely unsuitable when the distribution of a great number of calls is to be surveyed by area and time inside a cell. Furthermore, most of them require additional functions from the mobile station and the base stations, cause extra radio traffic, increase signalling load, etc.

SUMMARY OF INVENTION

The object of the present invention is a method for determining the geographical distribution of traffic in a cell accurately enough but without additional functions in mobile stations and base stations and without increasing signalling load.

This is attained with a method of the invention for locating hot spots of telephone traffic in a cell in a digital cellular mobile system. The method is characterized in that it comprises the steps of broadcasting an adjacent cell list to mobile stations in the cell, measuring the received signal level of the adjacent cells in the mobile stations with an ongoing call, reporting the measuring results from the mobile stations to the cellular network, determining for each mobile station a quantity representing the distance between the mobile station and the serving base station, determining a hot spot of telephone traffic in the cell by means of the adjacent cell measurement and said quantities.

The invention also relates to an arrangement according to claim 8 for locating hot spots of telephone traffic in a cell in a digital cellular mobile system.

The present invention employs two basic measurements used in digital radio systems, especially in time division multiple access (TDMA) radio systems: timing advance and adjacent cell measurement. In place of timing advance measurement, some other routine measurement can also be used to give as a result a quantity which directly informs the distance between the mobile station and the serving base station, or from which this distance can be deduced. This kind of other measurement may be based on signal level measurement, for example.

In timing advance measurement the serving base station measures the time offset between its own transmission and the transmission received from the mobile station and on the basis of the offset, determines a suitable timing advance for the mobile station. The timing advance is used for compensating the propagation delay caused by the distance between the base station and the mobile station. It is possible to calculate from this timing advance the distance travelled by a radio signal moving with the speed of light, from which distance the distance of the base station from the mobile station is derived by taking into consideration that the radio signal has once moved back and forth between the base station and the mobile station. In practice, depending on the resolution of timing advance, a specific distance range where the mobile station is located will be derived. Timing advance does not, however, inform the direction of location of the mobile station with respect to the base station, wherefore the location of the mobile station can be determined to be only in the area between two base-station-centric circles with different radii. This is as such too inaccurate information about the location of the mobile station.

In adjacent cell measurement the mobile station continuously measures the signals of adjacent cells closest to the serving base station for a possible crossover. In a broadcast the serving base station informs the mobile station of the adjacent base stations that it should measure. The mobile station sends regularly measurement results as a report message via the serving base station to the cellular network. It is also possible to determine on the basis of the signal strengths of these adjacent cells the location of the mobile station when there is information about the coverage area of individual adjacent cells. It is not, however, possible to determine unambiguously in this way the location of the mobile station as (because of terrain conditions) the signal level of the adjacent cell can be the same in different parts of the serving cell.

The present invention utilizes simultaneously both adjacent cell and timing advance measurement results. In this way they exclude the inaccuracies of each other and enable very accurate location determination for monitoring traffic distribution. It is possible to proceed so that by means of timing advance a set of circular, base-station-centric distance areas are determined and by means of adjacent cell measurements it is determined in which direction the mobile station is to the base station.

As both measurements already exist, they do not cause any additional demands on base stations or mobile stations. The mobile communication system should only be provided with means that collect and/or process this information for determining traffic distribution.

BRIEF DESCRIPTION OF DRAWINGS

In the following, the invention will be explained in more detail with reference to the appended drawings, wherein FIG. 2 is a measurement table according to the invention, FIG. 4 shows the structure of the measurement report sent by the base station controller, FIGS. 5 ad 6 illustrates determination of the coverage area of adjacent cell triplets.

PREFERRED EMBODIMENTS OF INVENTION

The present invention is suitable to be used in all cellular or trunking mobile communication systems where the transmission moment of the mobile station is adjusted by timing advance dependent on the distance between the mobile station and the base station, and where the mobile station routinely measures the signal levels of adjacent base stations during a call.

Figure 1:
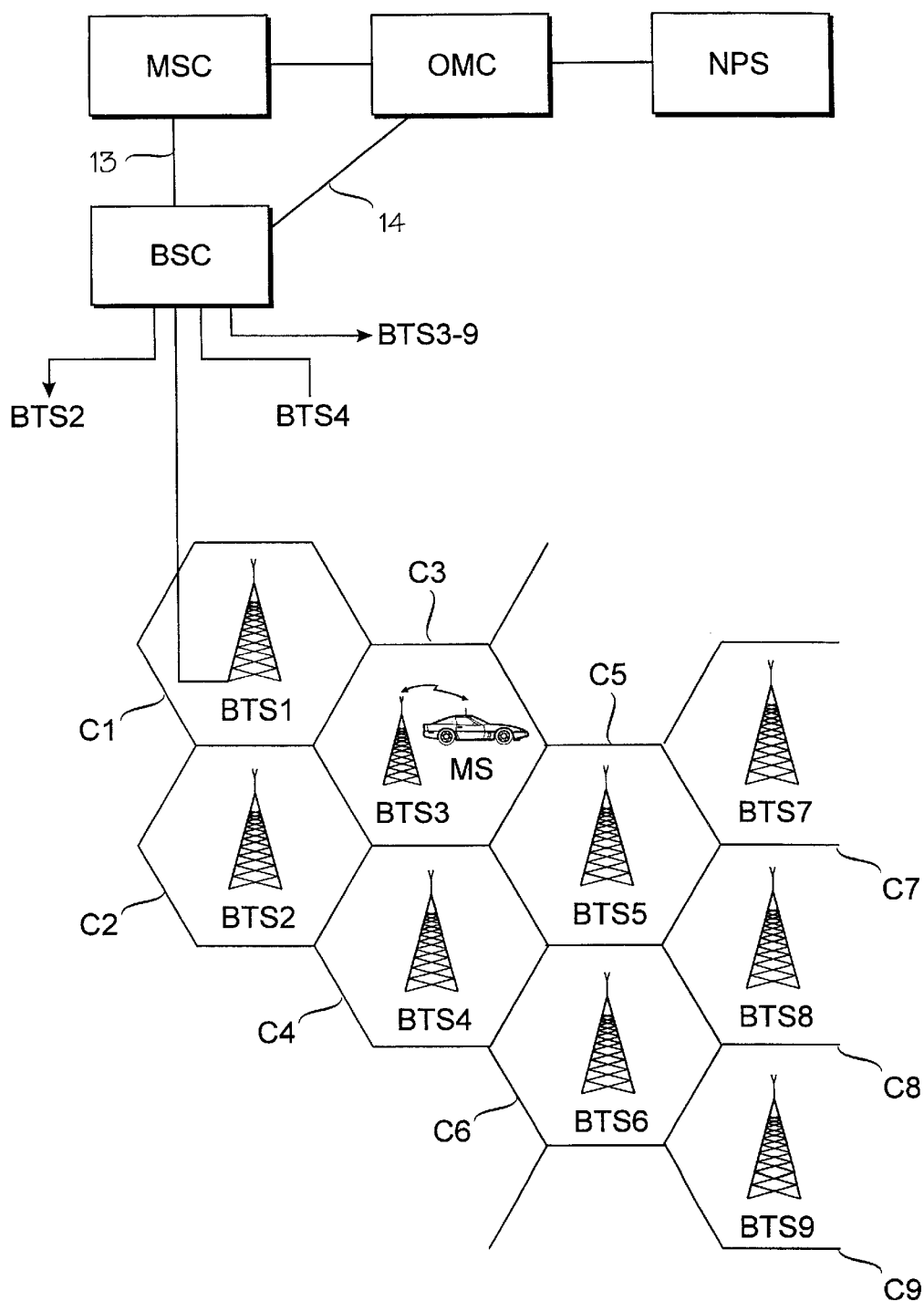
FIG. 1 shows a block diagram of a digital mobile communication system.

FIG. 1 shows as an example the GSM (Global System for Mobile Communications) mobile communication system. For a more detailed description of the GSM system, reference is made to GSM recommendations and *The GSM System for Mobile Communications*, M. Mouly & M. Pautet, Palaiseau, France, ISBN:2-9507190-0-7.

The mobile switching centre MSC attends to the switching of incoming and outgoing calls and it carries out functions characteristic of mobile telephone traffic only, such as subscriber location management, in cooperation with network subscriber registers. The mobile stations MS are connected to the MSC via base station systems BSS. The BSS is formed of a base station controller BSC and base stations BTS, that is, fixed radio transceivers via which the mobile stations MS communicate on the radio path with the fixed network. One base station controller BSC is used to control several base stations BTS. The functions of the BSC include e.g. handovers in cases where a handover is made inside the base station or between two base stations that are both controlled by the same BSC. For the sake of clarity, FIG. 1 shows only a base station system where nine base stations BTS1 to BTS9 are connected to the base station controller BSC, the radio area of the base stations being formed by corresponding radio cells C1 to C9. The operation of the mobile communication network is controlled and monitored from the operations and maintenance centre OMC.

It is characteristic of the mobile communication system that mobile stations MS can move freely and register from one cell to another in the area of the mobile communication system. Crossover or camping on is only a registration to a new cell when the mobile station does not have an ongoing call. When the mobile station has an ongoing call, the call also has to transferred from the traffic channel of the old cell to the traffic channel of the new cell. A crossover carried out during a call is called a handover (or a handoff). A handover may take place inside a cell from one traffic channel to another. To find out in the mobile communication system that there is a need for a handover and to select a suitable target cell of handover, various measurements of the quality of the connection on the traffic channel of the serving cell and the field strength measurements of adjacent cells to the serving cell are required. A handover from a serving cell to one of the adjacent cells may take place e.g. when the measurement results of the mobile station/base station indicate a low signal level and/or quality in a serving cell and a better signal level can be obtained from the adjacent cell.

For example, in the GSM system the mobile station MS measures (monitors) the signal level and quality of the serving cell in the downlink direction (from the BTS to the MS) and the signal levels of adjacent cells in the downlink direction. The broadcasting of the base station BTS of the serving cell on the control channel indicates to the mobile stations the adjacent cells (at most 32) and the control channel frequencies which the MS should measure. The MS reports regularly the measurement results to the base station BTS of the serving cell that transmits the measurement results regularly to the base station controller BSC. The measurement report sent by the MS contains at most the measurement results of six best adjacent cells. The BSC uses measurement results in handover decisions according to a predetermined handover algorithm.

Another general routine measurement in mobile communication systems is timing advance measurement. As is known, in the time division multiple access (TDMA) system, a set of mobile stations MS can use by time division the same radio channel (carrier frequency) for communicating with the base station BTS in radio systems. TDMA frames formed of several time slots, e.g. 4 or 8, are repeated on carriers. The time slots are allocated to the users on demand. At the base station the TDMA frame (reception) is delayed in the uplink direction e.g. three time slots from the beginning of the TDMA frame (transmission) in the downlink direction. The mobile station MS synchronizes with the signal from the serving base station BTS and sends it according to sync in such a manner that the signal of the mobile station is received at the base station in the correct time slot. The mobile stations MS may, however, be at different distances from the base station BTS, in which case the transmission moment of each MS must be adjusted (advanced) with respect to the reception moment by a time offset that compensates the propagation delay caused by distance in both downlink and uplink direction. This adjustment value of the transmission moment is called timing advance TA. The timing advance is measured at the base station BTS at least in connection with call establishment and handover, and it is transmitted to the mobile station MS via signalling.

The value of the timing advance TA can be interpreted to be the size of the distance between the BTS and the MS. The TA value indicates the radius of the base-station-centric circle or ring within which the MS is situated around the base station BTS. The TA does not inform in which direction the MS is with respect to the base station BTS.

The basic idea of the present invention is to use these two basic measurements of mobile communication systems known per se in the field in such a manner that the statistic geographical distribution of mobile calls and the hot spot in the cell can be determined accurately enough, but loading and by changing the network as little as possible.

The invention is not restricted to any specific adjacent cell measurement method. It is not significant for the invention how the measurements are carried out and reported. It is only essential for the invention that on the basis of measurement results obtained from the mobile station, at least two, preferably at least three strongest adjacent cells can be determined at suitable intervals, as will be explained in more detail below. One example of a possible adjacent cell measurement is adjacent cell measurement in the GSM system.

The present invention is neither restricted to any specific timing advance measurement method. It is only essential for the invention that the base station has available a timing advance value from which the distance between the base station BTS and the mobile station MS can be deduced. One example is the timing advance measurement of the GSM system.

According to the present invention, the timing advance measurement results of the adjacent cells are transmitted to the network unit or units that collect and classify measurement data and determine on the basis of them the hot spot of telephone traffic. In the preferred embodiment of the invention, the measurement data is collected and processed in a base station controller BSC from which the processed results are then reported to the OMC for analyzing and determining the hot spot.

The invention is in no way restricted to any specific calculation method or statistical method for finding the hot spot. The following describes a method by means of which the hot spot can be determined with relatively little calculation and data base capacity.

The preferred embodiment of the invention is described with reference to FIGS. 2 to 7. Traffic distribution is identified at the accuracy of the serving cell and two or more adjacent cells. In the described embodiment, adjacent cells are combined into triplets of three cells. The selection of cells for these triplets is made on the basis of adjacent cell measurements reported by the mobile stations in such a manner that in each measurement report the three adjacent cells with the highest measured signal levels form a triplet.

The range of the value of the timing advance TA is in the preferred embodiment of the invention divided into eleven sub-areas n0 to n10 as illustrated in FIG. 2. Information about the distribution of measured timing advances to different sub-ranges is collected in the BSC separately for each triplet into a table of FIG. 2. The table comprises the identifier fields of triplets triplet #1 . . . #100 and TA distribution counters n0 to n10 for each triplet. In addition, the total amount of traffic is measured by an allocation counter 21 of traffic channels (TCH) which is incremented whenever a traffic channel is allocated for a call in a cell (in connection with call establishment and handover). The next empty line in the table is indicated by a pointer 22. The table is filled, starting from the beginning and the overflowing triplets are taken into account only in the total traffic counter.

A triplet identifier can be any data by which the three adjacent cells belonging to the triplet can be identified. The measurement report of the mobile station MS contains base station identifier codes (BSIC) of the adjacent base stations but in the table it is possible to use a combination of a location area code LAC and a cell identifier CI. One alternative to save memory space is that the triplet identifier is shown in the table as a 32-bit variable where there is one bit for each adjacent cell according to a specific index table. The indexes are e.g. 0–31. For example if adjacent cells with indexes 1, 7 and 10 are selected for the triplet, the bits 1, 7 and 10 in the triplet identifier are set to "1" and the other bits to "0". It should be noted that the order of adjacent cells in the triplet has no significance, that is, e.g. triplet <10,1,7> has the same identifier as triplet <1,7,10>.

Figure 3:
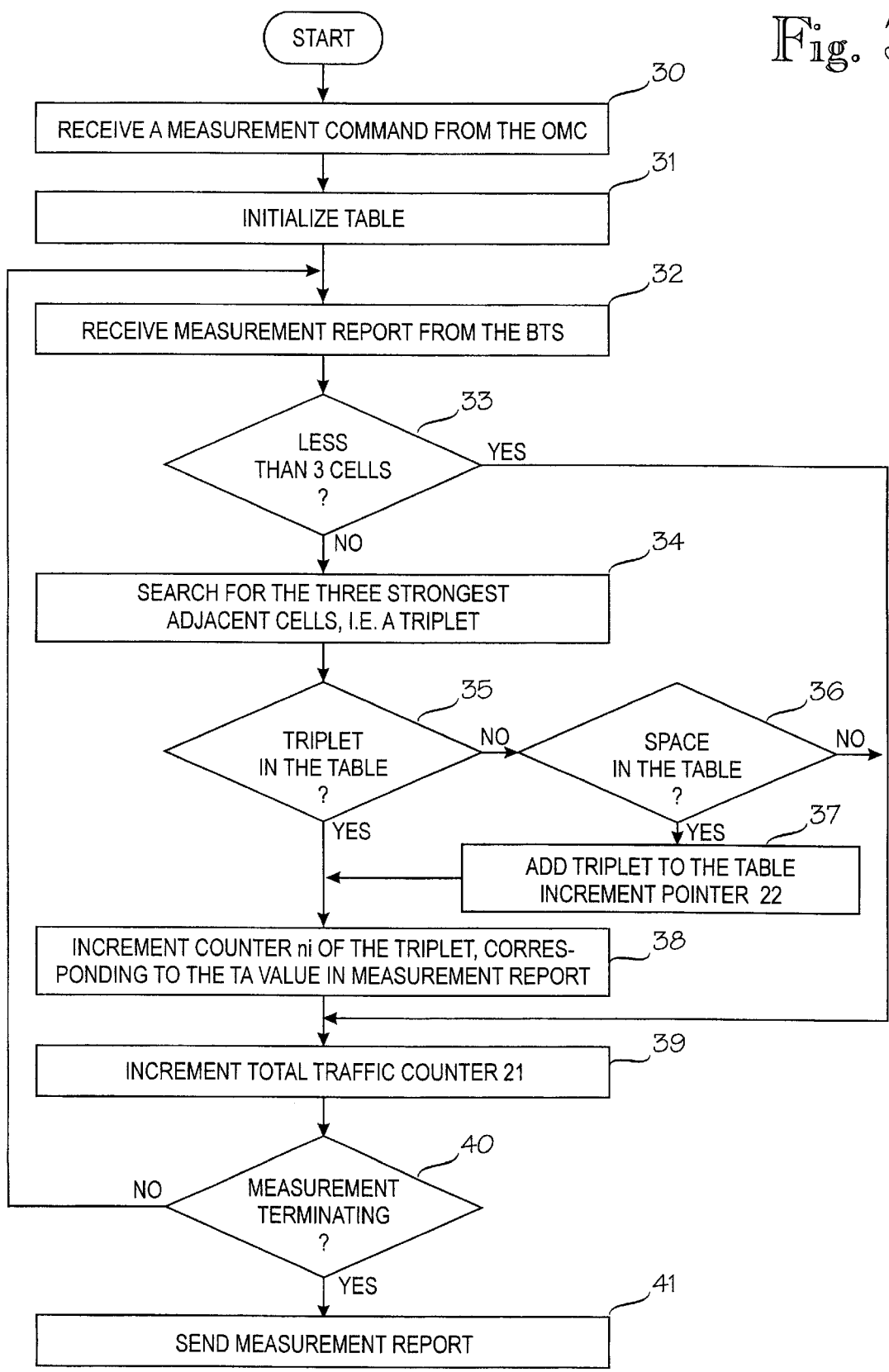
FIG. 3 is a flow diagram illustrating the collection of measurement data for the measurement table of FIG. 2.

Updating the table by means of measurement data with reference to the flow diagram of FIG. 3 is described in the following.

At step 30 the BSC receives a command message from the operations and maintenance centre OMC (or any other unit) to carry out the location measurement of the hot spot. The message should also indicate the cell in the area of which the hot spot should be located. Furthermore, the message should also indicate ten triplets that appear more frequently than in the previous measurement of this cell.

After having received the measurement command, the BSC initializes the table by resetting the identifier fields, the counters and the pointer of the table (step 31). After this, the identifiers of the ten triplets are placed at the beginning of the table and the free_slot_index pointer is moved to indicate line 11.

After initialization, the BSC starts to collect timing advance data and appearances of adjacent cell triplets into the table. The table is updated after each measurement report which is received from the base station BTS (and originally from the MS) of the measuring cell in the following way:

When the BSC receives a measurement report (step 32) it examines if the report has reported at least 3 adjacent cells (step 33). If there are less than 3 reported adjacent cells in the report, the routine proceeds to step 39.

If there are at least three of the reported adjacent cells, the three best adjacent cells are searched on the basis of signal level (step 34), i.e. a triplet. After this it is checked if the triplet identifier is already stored in the table of FIG. 2 (step 35). This takes place by proceeding from the beginning of the table to the line preceding the line indicated by the pointer 22.

If the triplet is found in the table, the respective timing advance counter n0 . . . n10 is incremented at the triplet that corresponds to the timing advance value received in the measurement report (step 38).

If the triplet is not found in the table, it is checked if there is space for a new triplet in the table (step 36). If there is space in the table, the triplet identifier is added to the table to the place the pointer 22 indicates and the pointer is incremented by one (step 37). After this the routine proceeds to step 38 and the respective timing advance counter n0 . . . n10 is updated at the triplet on the basis of the measurement report, as described above. If there is no space in the table, the routine proceeds from step 36 to step 39.

After step 33 the routine proceeds to step 39 where the total traffic counter 21 is incremented.

After step 39, it is checked if the measurement should be terminated (step 40). The termination of measurement is based on a termination command from the OMC, for example, to a predetermined measurement sequence which is determined in the measurement command, and so on. If the measurement is not terminated, the process is returned to step 32 to wait for a new measurement report. If the measurement is terminated, it is reported (step 41) as will be explained below. It is also possible that the measurement will be started automatically after the measurement report, in which case the routine will move to step 31.

It was assumed above that there is only one table for a cell. It is also possible that there are several tables, that is, one for each transceiver of the cell.

In the preferred embodiment of the invention, the measurement result that the BSC forwards is as in FIG. 4. The report comprises 10 most frequently appearing triplets, their timing advance counters and the total traffic counter 21. In FIG. 4 the triplet identifiers consist of the LAC and CI identifiers of the cells belonging to the triplet. The reports also preferably include a time stamp informing the reporting time.

The post-processing of the measurement results collected above is carried out in the preferred embodiment of the invention in the OMC or in a detached network planning equipment NPS to which the measurement data is transferred.

Figure 5:
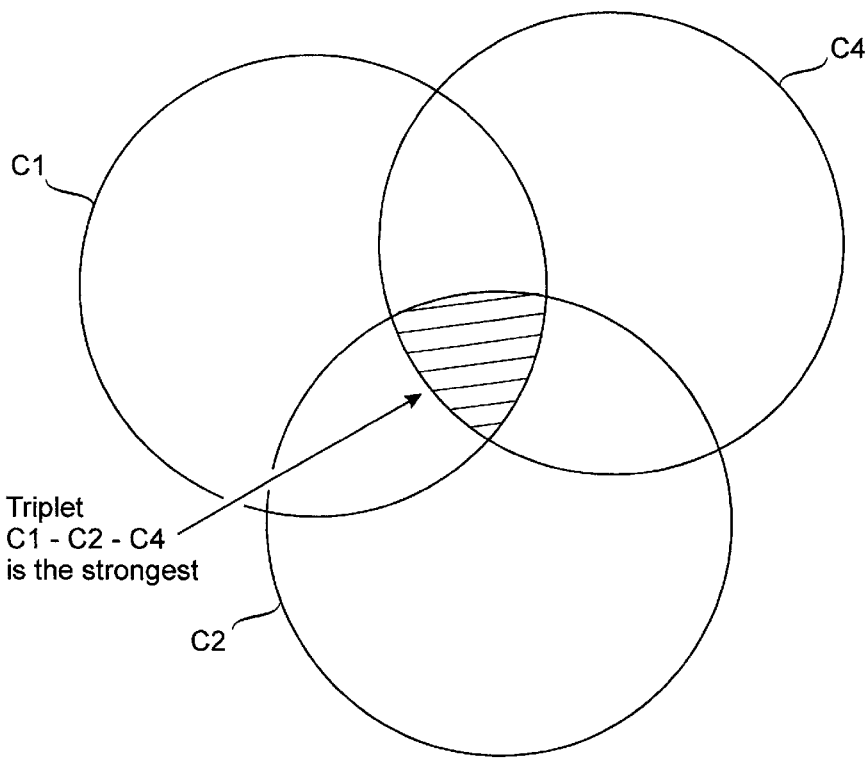

The OMC or the NPS has at least general information about the field strengths of the base stations of the adjacent cells in different parts of the cellular network in such a manner that it is possible to determine for each reported triplet the areas where the three cells belonging to the triplet have the strongest signal level. Let us examine the situation with reference to FIG. 1 where the measuring cell is C3 and the strongest adjacent cell triplet is C1-C2-C4. In theory, a clear intersection point of coverage areas can be found for the triplet C1-C2-C4 where the field strengths are the strongest. This is illustrated in FIG. 5.

Figure 6:
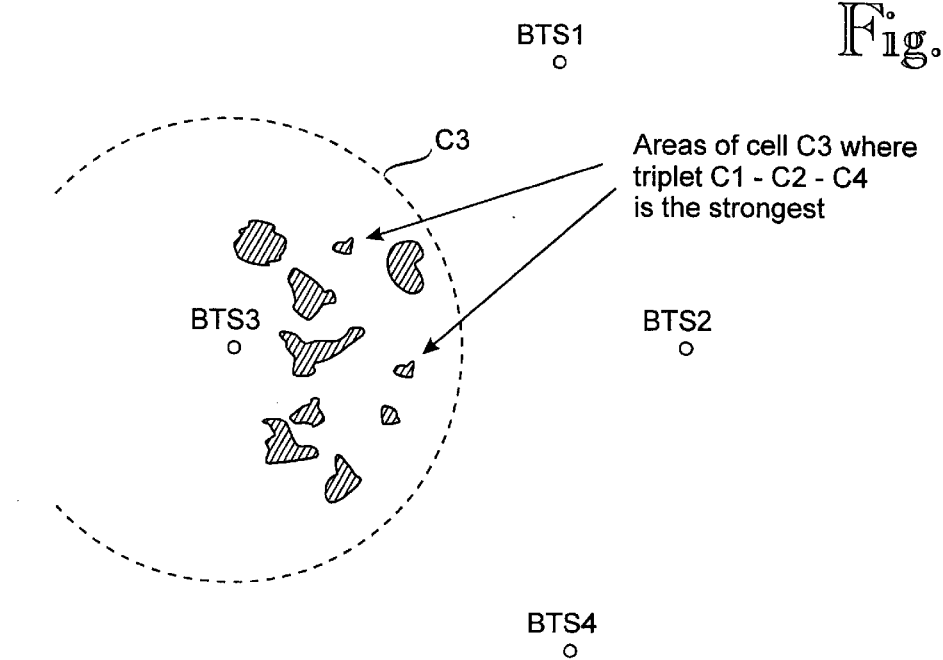
Figure 7:
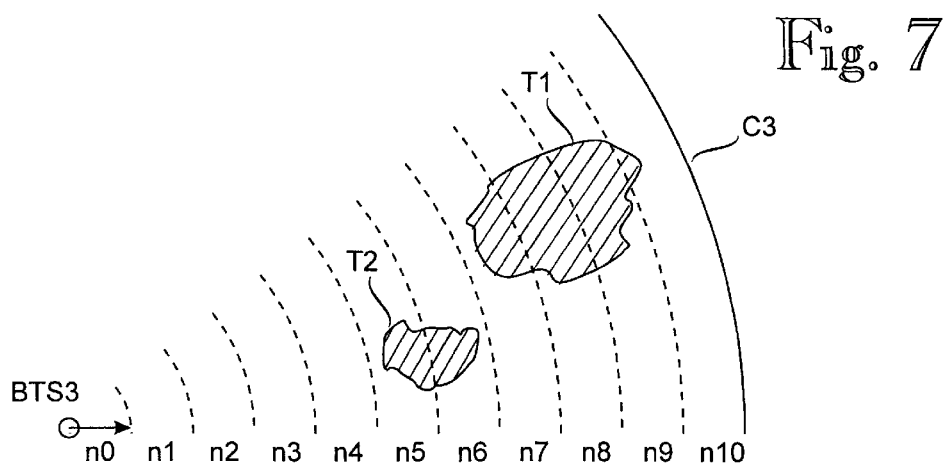
FIG. 7 shows timing advance (TA) ranges of the cell and the coverage areas of the triplet.
Figure 8:
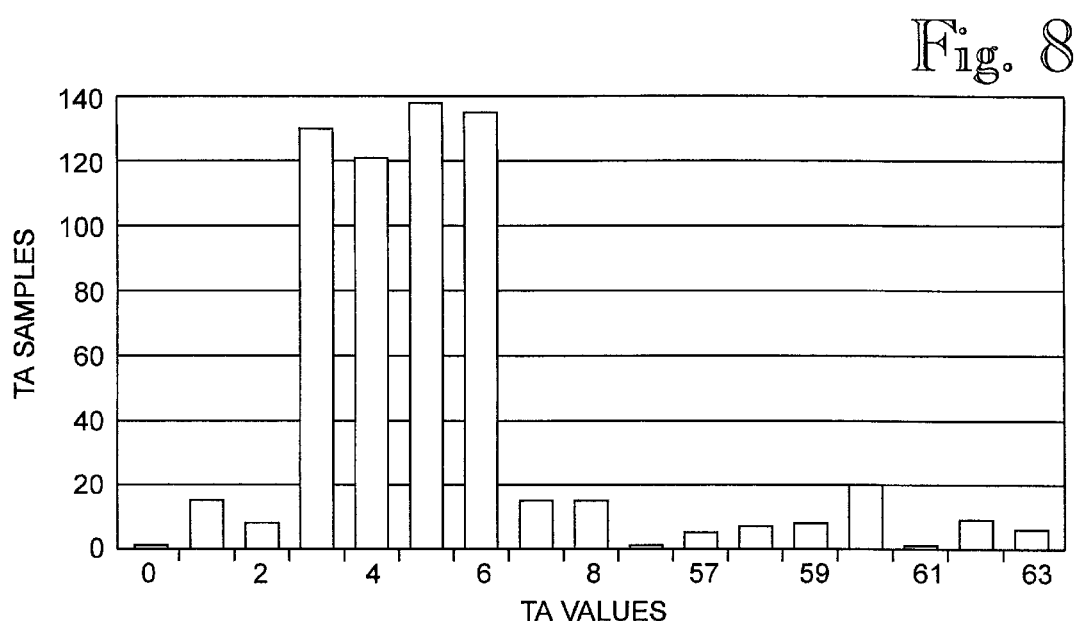
FIG. 8 shows a histogram illustrating the distribution of TA samples according to the second embodiment of the invention in different TA classes.
Figure 9:
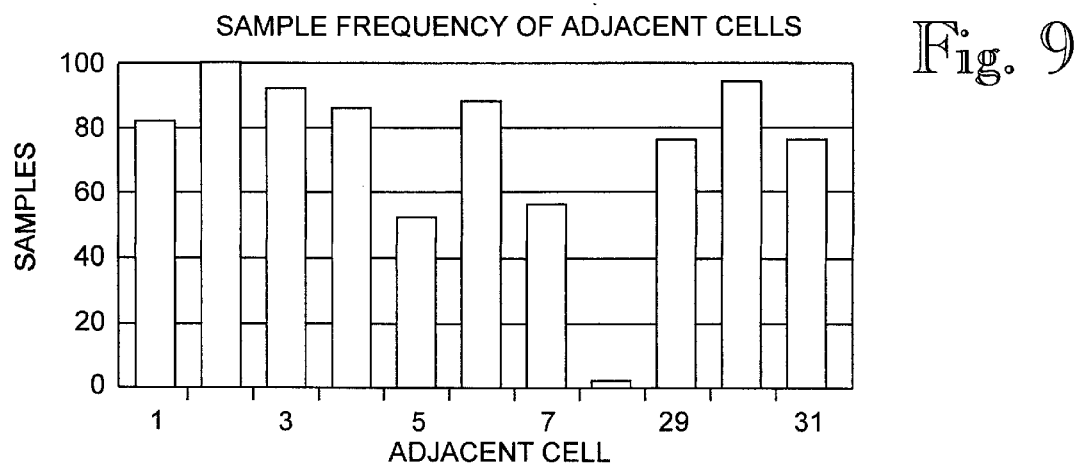
FIG. 9 is a histogram illustrating the sample quantities of adjacent cells in the largest TA class of FIG. 8.

In practice it is not generally possible to find this kind of one intersection as (due to terrain and radio signal propagation conditions) the signal level of the adjacent cell varies irregularly in the area of the examined cell. In practice, the areas of the triplet C1-C2-C4 form a cluster of small areas or points even, as is illustrated in FIG. 6. Between the clusters there are similar clusters of other triplets. These clusters could be determined by coverage area information in the OMC or the NPS at the required accuracy. These areas can be determined especially well by a network planning system where the network and the coverage areas are determined on a digital map. An example of network planning systems is NPS/X manufactured by Nokia Telecommunications Oy.

When the coverage area information of the triplet is combined to the circular areas defined by the sub-ranges of the timing advance value, the numbers of calls indicated by each timing advance counter n0 . . . n10 of each triplet can be placed at a specific location in the examined cell. For example, in FIG. 7 the calls of the counter n6 of the triplet C1-C2-C4 are placed in the intersection of TA circle n6 and triplet C1-C2-C4. By combining the information of all counters of all triplets, information about the geographical distribution of telephone traffic will be obtained. This distribution can be shown graphically on a digital map for example in such a manner that the colour or shade of the area depends on the number of calls in the area. Then the hot spot of the cell can be seen as the darkest point in the map, for example. Alternatively, the hot spot can be informed in many other ways, such as co-ordinate information, for example.

Above is a description of one way of utilizing TA and adjacent cell measurements for determining traffic distribution in a cell. Other ways will be evident to those skilled in the art on the basis of the above. In the following, the second embodiment of invention will be described with reference to FIGS. 8 to 11.

Timing advance measurements and adjacent cell measurements are carried out and reported to the base station controller BSC in the same way as explained above. The BSC determines the location of the hot spot in the cell in three phases:

1. Timing advance (TA) distribution measurement
2. Adjacent cell determination
3. Measurement of reception levels to a 13×13 matrix.

In the first phase the BSC measures the TA distribution in one cell and tries to find the TA classes having the highest number of TA samples. When the required number of samples have been processed in one cell, the BSC examines the TA distribution. The measured distribution is illustrated by a histogram in FIG. 8. If the BSC searches for the TA with the highest number of measured samples, and proceeds to the second phase if this number is higher than a specific limit value. If the number of samples in the selected TA class is lower than the limit value in question, the location process of the hot spot is decided upon.

In the second phase the object is to find two adjacent cells which are most frequently present in the adjacent cell measurements in the TA class determined in the first phase. The measured distribution is illustrated graphically in FIG. 9. When the required number of samples has been measured, the BSC searches for the two best cells, that is, the cells that have appeared most frequently in the samples. The number of the appearances of the cells has to exceed a specific limit value. If the cells are found, the process advances to the third phase. Otherwise the locating process of the hot spot is interrupted.

The third phase is used to generate a 13×13 matrix of the signal levels of two adjacent cells selected in the second phase. The BSC forms a 13×13 signal level matrix and stops when the BSC has received the required number of samples. The signal levels of the adjacent cells found in the second phase are measured for the TA class found in phase 1. The signal level classes in the matrix can be determined e.g. in 5 dB steps, that is, class 1: . . . −107 dBm
class 2: −106 . . . −102 dBm
class 12 −56 . . . −52 dBm
class 13: −51 dBm . . .

Figures 10, 11:
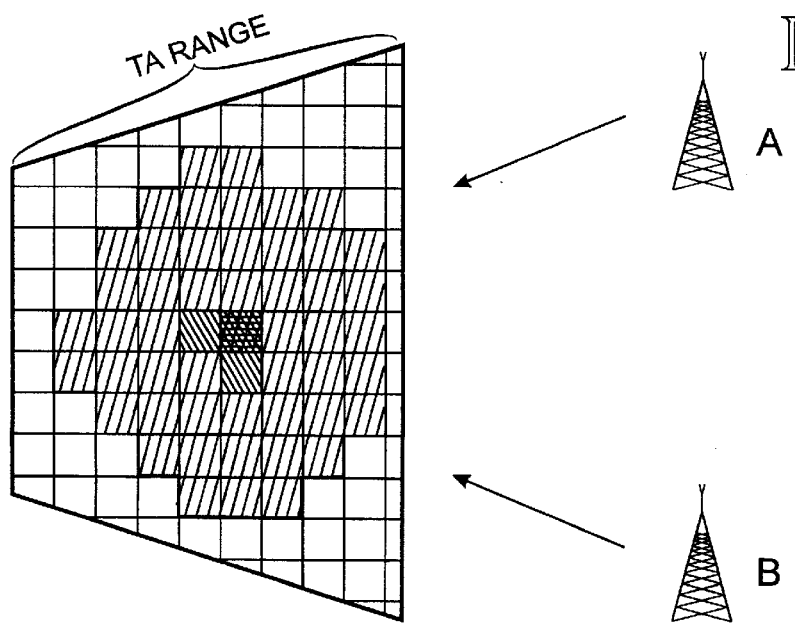
FIG. 10 shows a matrix informing the distribution of signal level samples of two most frequently appearing adjacent cells into different level classes.
FIG. 11 illustrates a graphical presentation of the hot spot on a digital map.

The completed matrix is illustrated graphically in FIG. 10. The hot spot of the cell can be determined on the basis of the signal level samples of the adjacent cells in the selected TA range of the examined cell. On the basis of known coverage area information of the cells, it is possible to determine the geographical position of each class of the matrix in the cell in the circle of the selected TA range and locate the sample numbers belonging to these classes geographically. As the sample numbers of the matrix are proportional to the level of telephone traffic, the geographical distribution of traffic distribution in the cell can be found out in the similar way as in the preferred embodiment of the invention. The final presentation of the results can again be made e.g. on a digital map of the network planning system NPS, in which case the distribution of calls can be shown with different shades, as illustrated in FIG. 11.

The figures and the specification related thereto are only intended to illustrate the present invention. In its details, the invention can vary within the scope of the present claims.

What is claimed is:

1. A method for locating hot spots of telephone traffic in a cell in a digital cellular mobile system, comprising:
    broadcasting an adjacent cell list to mobile stations in the cell,
    measuring the received signal level of the adjacent cells in the mobile stations with an ongoing call,
    reporting the measuring results from the mobile stations to the cellular network,
    determining for each mobile station a timing advance value proportional to the distance between the mobile station and the serving base station, and
    determining a hot spot of telephone traffic in the cell using the adjacent cell measurement and the timing advance values by,
        dividing a timing advance range into sub-ranges,
        forming groups of N cells from the adjacent cells, each group having a timing advance distribution counter for each timing advance subrange, where N=2,3, . . . ,
        selecting from each measurement report of the mobile station N adjacent cells whose measured received signal levels are the strongest,
        incrementing the timing advance distribution counter in the adjacent cell group which contains the selected adjacent cells, and
        determining the hot spot based on the coverage area information of the adjacent cells and the values of the distribution counters cumulated during a specific measurement sequence.

2. A method according to claim 1, further comprising dividing the cell into sub-areas on the basis of the values of the timing advance and the signal levels of adjacent cells,
    calculating the frequency of mobile stations in each sub-area during a specific measurement sequence on the basis of the measurement reports and the values of the timing advance, and
    identifying the sub-areas of the cell where the frequencies of the mobile stations are the highest as the hot spots of the cell.

3. A method according to claim 1, further comprising using, in determining the hot spot, a cellular network planning system which includes coverage area information of the cells.

4. A method according to claim 1, further comprising displaying a distribution of mobile stations graphically on a digital map display.

5. A method for locating hot spots of telephone traffic in a cell in a digital cellular mobile system comprising:
    broadcasting an adjacent cell list to mobile stations in the cell;
    measuring the received signal level of the adjacent cells in the mobile stations with an ongoing call;
    reporting the measuring results from the mobile stations to the cellular network;
    determining for each mobile station a timing advance value which is proportional to the distance between the mobile station and the serving base station;
    determining a hot spot of telephone traffic in the cell using the adjacent cell measurement and the timing advance values by
        dividing a timing advance range into sub-ranges,
        searching for the timing advance sub-range having the highest number of measurement results within a specific measurement sequence,
        selecting N adjacent cells included most frequently in the adjacent cell measurement reports in the searched timing advance sub-range where N=2,3, . . . ,
        forming a matrix of the measured signal levels of the N adjacent cells in the timing advance sub-range, and
        determining the hot spot of the cell on the basis of the coverage area information of N adjacent cells, the signal level matrix and the timing advance sub-range.

6. A method according to claim 5, wherein determining the hot spot comprises
    dividing the cell into sub-areas based on the timing advance values and the signal levels of adjacent cells,
    calculating the frequency of mobile stations in each sub-area during a specific measurement sequence based on the measurement reports and the timing advance values,
    identifying the sub-areas of the cell where the frequencies of the mobile stations are the highest as the hot spots of the cell.

7. A method according to claim 5, further comprising using, in determining the hot spot, a cellular network planning system which includes coverage area information of the cells.

8. A method according to claim 5, further comprising displaying a distribution of mobile stations graphically on a digital map display.

9. A system for locating hot spots of telephone traffic in a cell in a digital cellular mobile network, comprising:
    a base station arranged to broadcast an adjacent cell list to mobile stations in the cell,
    mobile stations with an ongoing call which are arranged to measure the received signal level of the adjacent cells and report the measurement results from the mobile stations to the cellular network,
    a base station arranged to determine a timing advance value proportional to the distance between the mobile station and the serving base station,
    a unit to determine a hot spot in the cell using the adjacent cell measurement and the timing advance values, the unit including
        a dividing unit to divide a timing advance range into sub-ranges,
        searching circuitry to search for the timing advance sub-range having the highest number of measurement results within a specific measurement sequence,
        circuitry to select N adjacent cells included most frequently in the adjacent cell measurement reports in the searched timing advance subrange where N=2,3, . . . , matrix forming circuitry to form a matrix of the measured signal levels of these N adjacent cells in the timing advance sub-range, and circuitry to determine the hot spot of the cell based on the coverage area information of N adjacent cells, the signal level matrix and the timing advance sub-range.

10. A system according to claim 9, wherein the cell is divided into sub-areas according to the values of the timing advance and the signal levels of the adjacent cells, and further comprising a calculating unit to calculate frequency of the mobile stations in each sub-area during a specific measurement sequence on the basis of the measurement reports and the values of the timing advance, and circuitry to recognize the sub-areas of the cell where the frequencies of the mobile stations are the highest as the hot spots of the cell.

11. A system for locating hot spots of telephone traffic in a cell in a digital cellular mobile network, comprising a base station arranged to broadcast an adjacent cell list to mobile stations in the cell, mobile stations with an ongoing call, the mobile stations being arranged to measure the received signal level of the adjacent cells and report the measurement results from the mobile stations to the cellular network, a base station arranged to determine a timing advance which is proportional to the distance between the mobile station and the serving base station, a unit to determine a hot spot in the cell using the adjacent cell measurement and the timing advance values, and further including circuitry to divide a timing advance range into sub-ranges, circuitry to form groups of N cells from the adjacent cells, each group having a timing advance distribution counter for each of said timing advance sub-range, where $N=2,3,\ldots$, selecting circuitry to select from each measurement report of the mobile station N adjacent cells whose measured received signal levels are the strongest, an incrementing unit to increment a timing advance distribution counter in the adjacent cell group which contains the selected adjacent cells, and circuitry to determine the distribution of mobile stations in a cell based on coverage area information of the adjacent cells and the values of the distribution counters cumulated during a specific measurement sequence.

* * * * *